United States Patent [19]
Howell

[11] B 3,923,749
[45] Dec. 2, 1975

[54] POLYMERIZATION OF CAPROLACTAM
[75] Inventor: Thomas J. Howell, Cornwells Heights, Pa.
[73] Assignee: Rohm and Haas Company, Philadelphia, Pa.
[22] Filed: Aug. 10, 1972
[21] Appl. No.: 279,583
[44] Published under the Trial Voluntary Protest Program on January 28, 1975 as document no. B 279,583.

[52] U.S. Cl. ............ 260/78 L; 161/173; 264/176 F
[51] Int. Cl.² .......................................... C08G 69/14
[58] Field of Search ................................... 260/78 L

[56] References Cited
UNITED STATES PATENTS

| | | | |
|---|---|---|---|
| 3,477,899 | 11/1969 | Kubitzek et al. | 260/78 L X |
| 3,542,743 | 11/1970 | Flamand | 260/78 L |
| 3,553,286 | 1/1971 | Murata et al. | 260/78 L X |

*Primary Examiner*—Lucille M. Phynes
*Attorney, Agent, or Firm*—Michael B. Fein

[57] ABSTRACT

Melt polymerization of caprolactam with a dilithium salt of unsubstituted 3,5-disulfobenzoic acid moiety in a reactor.

4 Claims, No Drawings

POLYMERIZATION OF CAPROLACTAM

This invention relates to the melt polymerization of caprolactam with a dilithium disulfobenzoic acid moiety chain terminator.

U.S. Pat. No. 3,542,743 points out that unmodified nylon is dyeable to a single color only and is almost exclusively dyed with acid dyes that are absorbed by amine groups of the nylon molecules. The application of basic dyes which are absorbed by carboxyl groups of the nylon molecules, results in colored nylon having unacceptable wash and light fastness properties. Nylon has been modified, however, to improve its dyeability by forming the nylon in the presence of mono- or disulfonated benzoic acids to provide nylon comprising molecules having at least one terminal group having benzene sulfonate groups. Modified nylons of this type are described in U.S. Pat. Nos. 3,142,662 (monosulfonated compounds) and 3,542,743 (disulfonated compounds). The modified molecules serve a dual role. First, they provide sulfonate groups which can be activated to absorb basic dye under acid conditions without activation of carboxyl groups, thereby providing color of acceptable wash and light fastness. Secondly, they impart acid dye-resistant properties to the nylon by forming salts with amine end groups to unmodified molecules, thereby rendering these amine groups no longer available to absorb acid dyes. U.S. Pat. No. 3,542,743 indicates that the disulfonated nylons have better dyeing properties than the monosulfonated nylons.

Recently, modified nylons of the type just described have found utility in preparing textile fabrics which are dyeable in a single dye bath to multiple color effects. These fabrics, hereinafter referred to as "multi-yarn fabrics", are prepared by weaving or knitting a plurality of nylon yarns, each having different dyeing characteristics, into a single fabric. For example, the fabric may be prepared by combining yarns spun from modified nylon with yarns spun from unmodified (standard) nylon in such a manner that, when the fabric is immersed in a dye bath containing selected acid dyes or selected basic dyes or a combination of selected acid and basic dyes, the fabric is dyed to a plurality of different colors or color tones defining a pattern or design. Also, since the modified yarns tend to resist acid dyes and retain their natural white color when subjected thereto, a fabric prepared from modified and standard nylon yarns can be dyed with acid dyes to obtain a fabric using the pattern of which is defined by white yarn and one or more colored yarn.

Although U.S. Pat. No. 3,542,743 indicates that all polycarbonamides can be modified with various substituted and unsubstituted disulfobenzoic acids the patentee only describes the production of polycarbonamides formed from diamines and dicarboxylic acids, wherein all the reactants are condensed initially in aqueous solution. The patentee does not disclose how to modify polylactams, which are normally condensed in a molten state. Attempts by applicant to condense molten caprolactam with the disodium or dipotassium salt of unsubstituted 3,5-disulfobenzoic acid in continuous reactors and batch reactors has been unsuccessful since these salts are insoluble in molten caprolactam. The filtering systems for the caprolactam addition liners filtered most of these salts out of the molten caprolactam being charged to the reactors.

The object of this invention is to condense molten caprolactam with a disulfobenzoic acid moiety to produce a nylon 6 polymer capable of use in multi-yarn fabrics. Another object of this invention is to condense molten caprolactam with a disulfobenzoic acid moiety in a continuous reactor to produce a nylon 6 polymer capable of the use in "multi-yarn fabrics.

I have now found that the objects of this invention can be attained by condensing molten caprolactam with an unsubstituted dilithium 3,5-disulfobenzoic acid moiety. Unlike the corresponding disodium and dipotassium salts, unsubstituted dilithium 3,5-disulfobenzoic acid is soluble in molten caprolactam and condenses readily with polycaprolactam amine end groups to terminate the polymer chain. since the unsubstituted dilithium disulfobenzoic acid can be evenly distributed throughout the caprolactam prior to reaction, polycaprolactam of relatively uniform molecular weight suitable for fiber use is obtained. Yarns spun from the modified polycaprolactam of this invention have enhanced dyeing properties and are particularly useful in fabricating multi-yarn fabrics, previously described, which are dyeable in one-bath procedures to multiple color effects.

Briefly, the dilithium disulfobenzoic acid modified caprolactam is prepared by adding unsubstituted dilithium disulfobenzoic acid moiety, dissolved in molten caprolactam, to a continuous reactor or a batch antoclave and heating to an elevated temperature (e.g., 240° to 300 °C.). When a continuous tube reactor is employed, the unsubstituted dilithium disulfobenzoic acid moiety dissolved in the molten caprolactam, is continuously added to the top of a polymerization tube, such as a so-called VK-tube, which is maintained at elevated temperature (e.g., 240° to 300 °C.), and polycaprolactam bearing dilithium disulfobenzamide end group is continuously withdrawn from the bottom of the reactor. For example, any of the techniques and/or apparatus described in U.S. Pat. Nos. 2,562,796 and 3,565,866, etc. can be used. Alternatively, the caprolactam and dilithium disulfobenzoic acid moiety can be added separately to the reactor. However, it is more difficult to meter in the exact amount of reactant and a somewhat less uniform molecular weight distribution may be obtained from batch to batch.

For purposes of this invention, the terms "unsubstituted dilithium disulfobenzoic acid moiety" and "dilithium salt of unsubstituted disulfobenzoic acid moiety" refer to a benzene ring bearing two sulfo groups, one carboxyl group and 3 nuclear hydrogen atoms, wherein the carboxyl group can be in the free acid form or as a lower alkyl ester (methyl, ethyl, n-propyl or isoproyl).

The unsubstituted dilithium 3,5-disulfobenzoic acid moiety can be used in a concentration of from about 20 to 45 millimoles, preferably 30 to 40 millimoles, per kilogram caprolactam. In general, the higher the concentration of the disulfobenzoic acid moiety, the better the dyeing properties of the polymer. However, since the disulfobenzoic acid moiety acts as chain terminator, the higher the concentration of this ingredient the lower the molecular weight of the polymer, particularly polymers produced by continuous process. Inasmuch as fiber forming nylon 6 must have a relative viscosity of 2.2 to 3.0, preferably 2.4 to 2.8, the unsubstituted dilithium 3,5-disulfobenzoic acid moiety can be used in a concentration of from about 20 to 45 millimoles, preferably 30 to 40 millimoles, per kilogram caprolactam. For example, nylon 6 produced in a continuous reactor typically has a relative viscosity of (1) 2.2 when produced with 45 millimoles and (2) 2.4 when produced with 40 millimoles and (3) 2.5 to 2.6 when produced with 30 millimoles. The excellent dyeability characteristics of the fiber produced in accordance with this invention drop off rapidly as the concentration of disulfobenzoic acid moiety decreases from 30 to 20 millimoles.

The following example is merely illustrative and should not be construed as limiting the scope of this invention:

EXAMPLE

Approximately 200 kilograms of caprolactam and 30 millimoles of unsubstituted dilithium salt of 3,5-disulfobenzoic acid per kilogram of caprolactam were added to a charge tank, heated to about 90° to 100°C. with agitation to liquify the caprolactam and uniformly disperse the disulfobenzoic acid. The caprolactam composition was then conveyed to a large supply tank, maintained at 90° to 100°C. The molten caprolactam composition was conveyed continuously from the supply tank through a filter to the top of a 10 foot high pilot plant V.K. tube of approximately 1 foot diameter. The V.K. tube was maintained at 260°C. at its top, about 280°–290°C. in the middle and about 240°C. at the bottom discharge point for the polycaprolactam. The caprolactam composition had a residence time in the reactor of about 20 hours. The polycaprolactam bearing unsubstituted disulfobenzamide end groups had a relative visocisty (1 percent in sulfuric acid) of 2.5.

The finished disulfobenzamide modified polymer was melt spun at 265°C. through a 70 hole spinnerette yielding white multi-filament yarns. Yarns from unmodified polycaprolactam and the disulfobenzamide modified polymer were drawn at 180°C. at a draw ratio of 4:1 and immersed in a dye bath containing buffers, Acid Blue 122, Basic Red 23 and dispersants, from which an excellent multi-hued yarn was obtained.

Since many embodiments of this invention may be made and since many changes may be made in the embodiments described, the foregoing is to be interpreted as illustrative only and the invention is defined by the claims appended hereafter.

What is claimed is:

1. The method of producing a fiber-forming polymer which comprises melt polymerizing caprolactam with a dilithium salt of unsubstituted 3,5-disulfobenzoic acid moiety in a reactor in the ratio of 20 to 45 millimoles of salt per kilogram of caprolactam.

2. The method of claim 1, wherein said dilithium salt of unsubstituted 3,5-disulfobenzoic acid moiety is added to said reactor in a molten solution of caprolactam.

3. The method of claim 2, wherein said molten solution of caprolactam is added to a continuous reactor.

4. The product prepared by the process of claim 1.

* * * * *